US005438155A

United States Patent [19]

Matsuda et al.

[11] Patent Number: 5,438,155

[45] Date of Patent: Aug. 1, 1995

[54] ELECTRONIC MUSICAL INSTRUMENT WITH NUMERIC INPUTTING FUNCTION

[75] Inventors: Eiji Matsuda; Toshinori Matsuda; Tsuyoshi Koike, all of Iwata, Japan

[73] Assignee: Kabushiki Kaisha Kawai Gakki Seisakusho, Hamamatsu, Japan

[21] Appl. No.: 154,086

[22] Filed: Nov. 18, 1993

[30] Foreign Application Priority Data

Nov. 20, 1992 [JP] Japan .................... 4-333744

[51] Int. Cl.[6] .................... G09B 15/02; G10H 1/02; G10H 1/18

[52] U.S. Cl. .................... 84/653; 84/662; 84/477 R

[58] Field of Search .................... 84/615–620, 84/622–633, 653–665, 477 R, 478

[56] References Cited

U.S. PATENT DOCUMENTS 5,179,238 1/1993 Hotta .................... 84/478

*Primary Examiner*—Stanley J. Witkowski
*Attorney, Agent, or Firm*—Oliff & Berridge

[57] ABSTRACT

An electronic musical instrument having a plurality of switches is disclosed wherein a numerical value can be inputted without provision of a specific switch for inputting a numerical value. The electronic musical instrument has a tone/effect inputting mode in which, when one of the switches is operated, a tone or acoustic effect allocated in advance to the operated switch is set and a numeric inputting mode in which, when one of the switches is operated, a numerical value allocated in advance to the operated switch is set. A change-over switch is provided for changing over the operation mode between the tone/effect inputting mode and the numeric inputting mode.

5 Claims, 4 Drawing Sheets

ELECTRONIC MUSICAL INSTRUMENT WITH NUMERIC INPUTTING FUNCTION

BACKGROUND OF THE INVENTION

1. Field of the Invention

This invention relates to an electronic musical instrument to which numerical values can be inputted.

2. Description of the Related Art

Conventional electronic musical instruments employ ten keys (keys to which numerical values from 0 to 9 are allocated), an up/down switch, a slide volume or like means in order to input numerical values.

The inputting means which employs ten keys requires provision of ten keys for inputting the numerical values and requires a considerably high cost. Meanwhile, the inputting means which employs an up/down switch or a slide volume requires an indicator for indicating numerical values to be set. Consequently, a considerable cost is required for provision of the indicator.

SUMMARY OF THE INVENTION

It is an object of the present invention to provide an electronic musical instrument with a numeric inputting function which can be produced at a reduced cost.

In order to attain the object described above, according to the present invention, there is provided an electronic musical instrument, which comprises a plurality of operation elements, first setting means operable in response to operation of one of the operation elements for setting a tone or acoustic effect allocated in advance to the operated operation element, second setting means operable in response to operation of one of the operation elements for setting a numerical value allocated in advance to the operated operation element, and change-over means for selectively rendering one of the first setting means and the second setting means operative.

The change-over means may include one of the operation elements whose operation selects one of the first setting means and the second setting means to be rendered operative.

In the electronic musical instrument, since the operation elements are normally used to select a tone or an acoustic effect, the change-over means is normally set so that the first setting means may operate. When it becomes necessary to input a numerical value, the change-over means is operated so that the second setting means may operate in response to operation of the operation elements. Consequently, when one of the operation elements is operated, a numerical value allocated to the operated operation element is inputted.

With the electronic musical instrument, a numerical value can be inputted although it does not include a special operation element for inputting a numerical value. Consequently, the electronic musical instrument having a numeric inputting function can be provided at a reduced cost.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
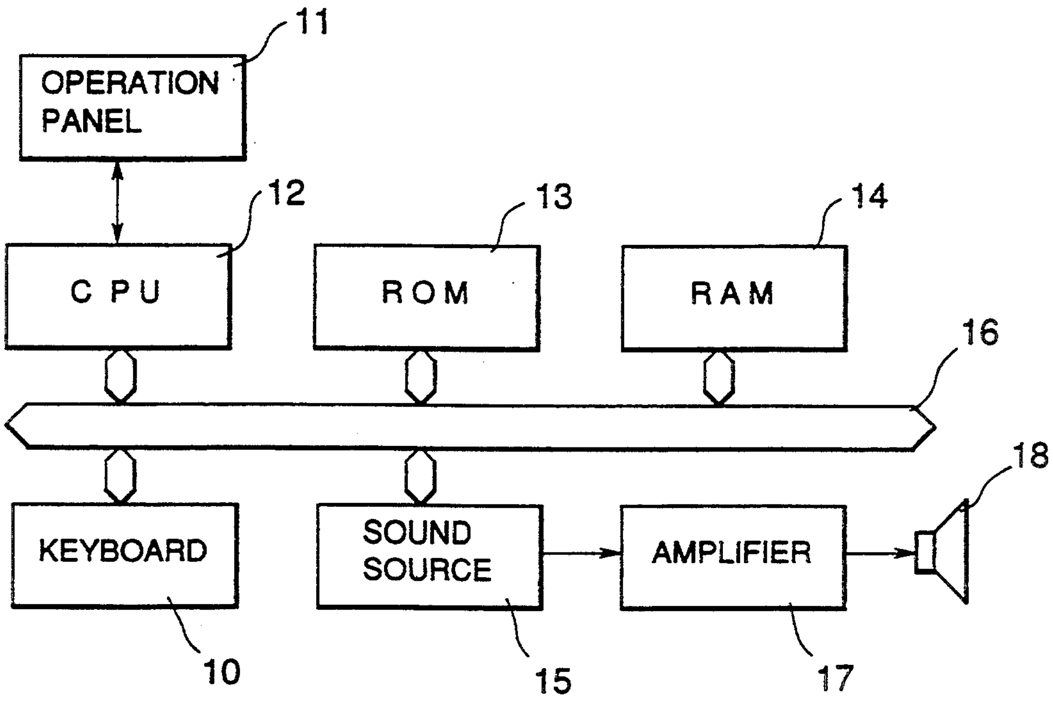
FIG. 1 is a block diagram of an electronic musical instrument showing a preferred embodiment of the present invention.

Referring first to FIG. 1, there is shown a general construction of an electronic musical instrument to which the present invention is applied.

The electronic musical instrument shown includes a keyboard 10 which detects a depressing or releasing operation of keys by a player by means of touch sensors and supplies the detected information to a CPU (central processing unit) 12.

The electronic musical instrument further includes an operation panel 11 on which various switches are provided. The operation panel 11 will be hereinafter described in detail.

The CPU 12 controls components of the electronic musical instrument in accordance with a control program stored in a ROM (read only memory) 13. Information transmitted from the keyboard 10 to the CPU 12 is processed by the CPU 12 and supplied to a sound source 15.

The ROM 13 stores in advance therein the control program for operating the CPU 12 and sound information.

A RAM (random access memory) 14 serves as a working area of the CPU 12.

The sound source 15 supplies, in response to information of depression or release of a key supplied thereto from the CPU 12, a sound signal of the operated key to an amplifier 17 so that the sound may be generated from a loudspeaker 18.

A bus 16 serves as a common information transfer path for transferring data, a program and some other information therethrough.

Figure 2:
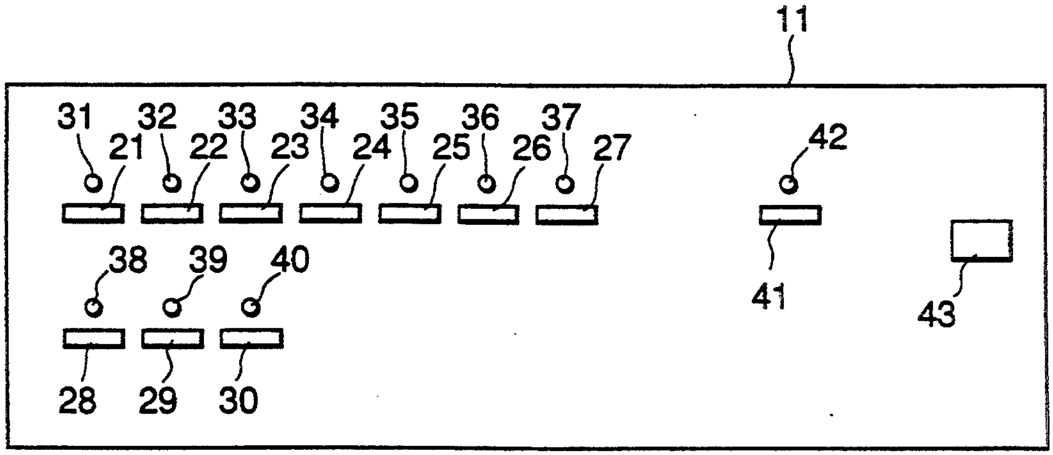
FIG. 2 is a schematic view showing an operation panel of the electronic musical instrument of FIG. 1.

Referring now to FIG. 2, the operation panel 11 has various switches provided thereon. In particular, the operation panel 11 includes tone switches 21 to 27 and effect switches 28 to 30. The operation panel 11 further includes light emitting diodes (LEDs) 31 to 40 for indicating on/off states of the switches 21 to 30, respectively.

The operation panel 11 further includes a numeric input select switch 41 for switching inputting between tone and effect inputting and numeric inputting, and an LED 42 for indicating an on/off state of the numeric input select switch 41. The electronic musical instrument enters a numeric inputting mode when the numeric input select switch 41 is turned on, but when the numeric input select switch 41 is turned off, the electronic musical instrument enters a tone and effect inputting mode. When any of the switches 21 to 30 is depressed in the numeric inputting mode of the electronic musical instrument, that one of numerical values from 0 to 9 allocated to the switches 21 to 30 in advance which corresponds to the depressed switch is inputted. Since numerals of the numerical values allocated to the switches 21 to 30 are indicated in advance in the proximity of the switches 21 to 30 on the panel 11, respectively, the person who tries to operate a switch can input a numerical value accurately looking at a numeral indicated there.

The operation panel 11 further includes a power source switch 43.

Figure 3:
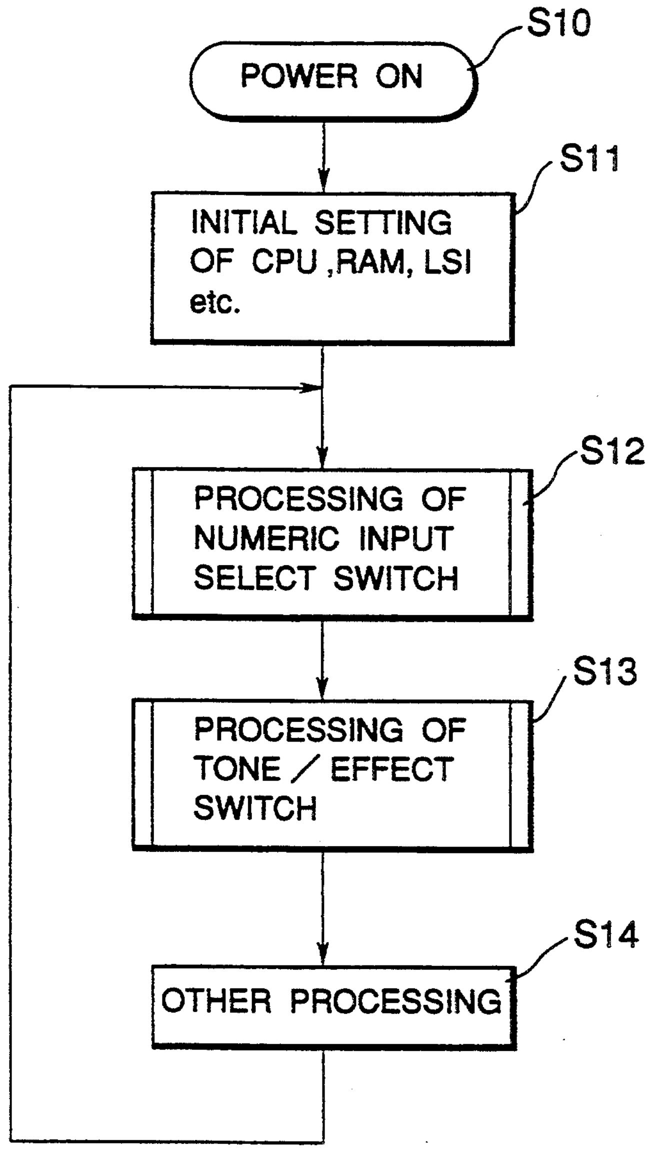
FIG. 3 is a flow chart illustrating processing operation of the electronic musical instrument of FIG. 1.

An outline of the processing operation of the entire electronic musical instrument of the construction described above is illustrated in FIG. 3. Referring to FIG. 3, reference numerals having a prefix S denote sequential numbers in the processing procedure.

After power is made available at step S10, initial setting of the CPU 12, the RAM 14, LSI and so forth is performed at step S11.

Thereafter, processing of the numeric input select switch at step S12, processing of the tone/effect switch at step S13 and other processing at step S14 are repeated.

The processing of the numeric input select switch and the processing of the tone/effect switch will be described in detail below.

[Processing of Numeric Input Select Switch]

In the processing, inputting of a numerical value is enabled while the numeric input select switch 41 remains on, but when the numeric input select switch 41 changes from an on state to an off state, the numerical value inputted then is established as a set value. In particular, in order to input a numerical value, a corresponding one of the tone switches 21 to 27 and the effect switches 28 to 30 is depressed while the numeric input select switch 41 is kept depressed to select the numerical value (one of the numerical values 0 to 9) allocated to the switch, and then the numeric input select switch 41 is released, whereupon the numerical value is set.

Figure 4:
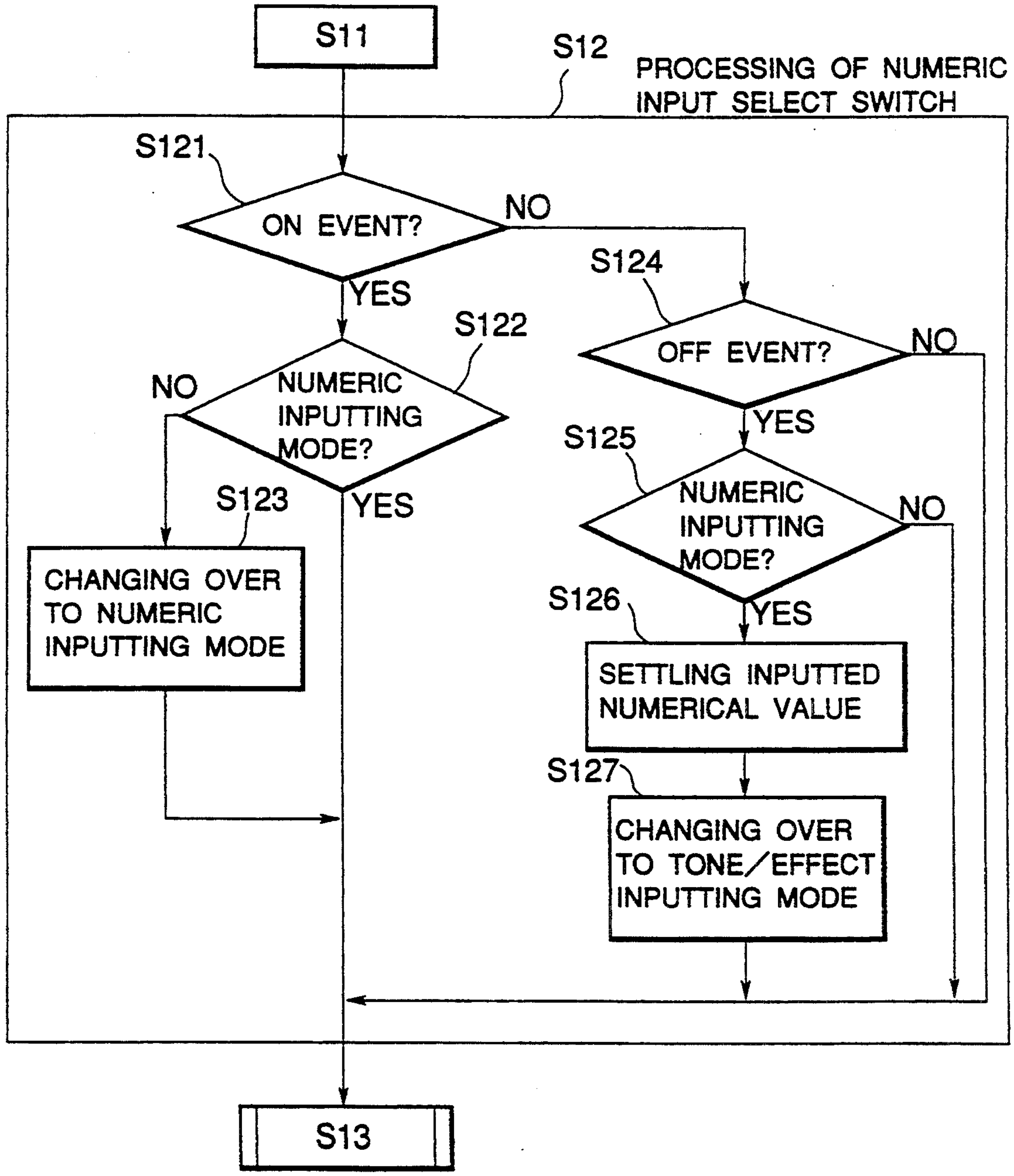
FIG. 4 is a flow chart illustrating detailed operation of the process of a numeric input select switch in the flow chart of FIG. 3.

A flow chart illustrating detailed processing operation of the process of the numeric input select switch at step S12 of FIG. 3 is shown in FIG. 4. The processing operation will be described with reference to FIG. 4.

First, it is determined at step S121 whether there is an on event with the numeric input select switch 41, that is, whether the state of the numeric input select switch 41 has changed from an off state to an on state.

When the determination at step S121 is "Yes", since this signifies that the state of the numeric input select switch 41 has changed to an on state, the mode of the electronic musical instrument is changed over from the tone/effect inputting mode to the numeric inputting mode at steps S122 and S123.

On the contrary when the determination at step S121 is "No", it is determined at step S124 whether there is an off event, that is, whether the state of the numeric input select switch 41 has changed from an on state to an off state.

When the determination at step S124 is "Yes", it is determined at step S125 whether or not the electronic musical instrument is in the numeric inputting mode, and then when the determination at step S125 is "Yes", that is, when the electronic musical instrument is in the numeric inputting mode, a numerical value inputted at this point of time is settled as a set value at step S126. Then, the mode of the electronic musical instrument is changed over from the numeric inputting mode to the tone/effect inputting mode at step S127. The process of the numeric input select switch at step S12 is completed with this, and the control sequence advances to the process of the tone/effect switch at the next step.

On the contrary when the determination at step S124 is "No" or when the determination at step S125 is "No", the processing at step S12 of the flow chart of FIG. 3 is completed with this, and the processing at step S13 is executed subsequently.

[Processing of Tone/Effect Switch]

Figure 5:
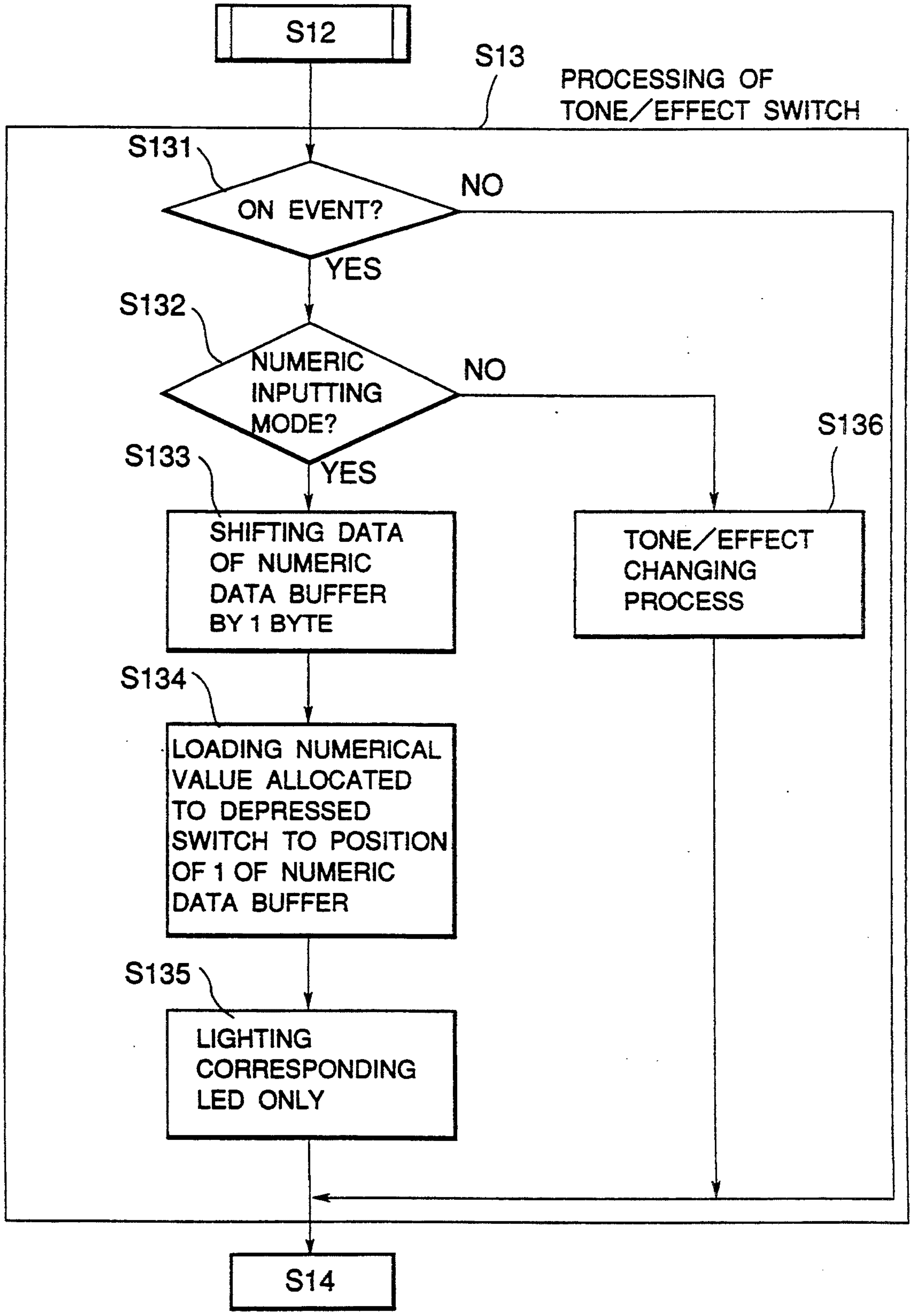
FIG. 5 is a flow chart illustrating detailed operation of the process of a tone/effect switch in the flow chart of FIG. 3.

The processing is executed when a tone switch or an effect switch is depressed. A flow chart which illustrates details of the process of the tone/effect switch is shown in FIG. 5. It is to be noted that, while processing only of one switch is illustrated for simplified illustration in FIG. 5, actually similar processing is performed for each of a plurality of tone and effect switches operated by the user.

Referring to FIG. 5, it is first determined at step S131 whether there is an on event with each of the switches 21 to 30, that is, whether any one of the switches 21 to 30 has been depressed.

When the determination at step S131 is "No", since this signifies that no switch has been depressed, the processing of the tone/effect switch is completed with this, and the other processing at step S14 of the flow chart of FIG. 3 is executed subsequently.

On the contrary when the determination at step S131 is "Yes", it is determined at step S132 whether the electronic musical instrument is in the numeric inputting mode.

When the determination at step S131 is "Yes" and the electronic musical instrument is in the numeric inputting mode, the determination at step S132 is "Yes", and consequently, numeric inputting processes at steps S133 to S135 are executed subsequently. In particular, data in a numeric data buffer are shifted upwardly by one byte distance at step S133, and then a numerical value from 0 to 9 allocated to the depressed switch is loaded to the position of 1 of the numeric data buffer at step S134, whereafter only that one of the LEDs which corresponds to the depressed switch is lit at step S135. The process of the tone/effect switch is completed with this, and the other processing at step S14 of the flow chart of FIG. 3 is executed subsequently.

On the contrary when the determination at step S132 is "No", since this signifies that the electronic musical instrument is not in the numeric inputting mode but in the tone/effect inputting mode, processing for changing the tone/effect applied to the depressed switch is executed at step S136. The processing of the tone/effect switch is completed with this, and the other processing at step S14 of the flow chart of FIG. 3 is executed subsequently.

Having now fully described the invention, it will be apparent to one of ordinary skill in the art that many changes and modifications can be made thereto without departing from the spirit and scope of the invention as set forth herein.

What is claimed is:

1. An electronic musical instrument having no digital display device, comprising:

a plurality of operation elements normally used for setting a tone or acoustic effect;

first setting means operable in response to operation of one of said plurality of operation elements for setting the tone or acoustic effect allocated in advance to the operated operation element;

second setting means operable in response to operation of one of said operation elements for setting a numerical value allocated in advance to the operated operation element; and change-over means for normally rendering said first setting means operative, and selectively rendering said second setting means operative only when a predetermined operation element is operated, said first setting means and said second setting means being comprised of a single set of operation elements, whereby a numerical value can be set by use of the operation elements for setting the tone or acoustic effect without using a digital display device nor a numeric input switch.

2. An electronic musical instrument according to claim 1, further comprising indication means for indicating one of said first setting means and said second setting means selected by said change-over means.

3. An electronic musical instrument according to claim 1, wherein numerical values allocated to said operation elements are indicated in advance in the proximity of said operation elements.

4. An electronic musical instrument according to claim 1, wherein, when said change-over means is operated so as to change over the operative setting means from said second setting means to said first setting means, a numerical value being inputted then is settled as a set value by said second setting means, and then the operative setting means is changed over from said second setting means to said first setting means.

5. An electronic musical instrument according to claim 1, further comprising a numeric data buffer, and wherein, upon inputting of a numerical value, data in said numerical data buffer are shifted upwardly by one byte distance, and a numerical value allocated to an operated one of said operation elements is loaded into position of 1 of said numeric data buffer, whereafter one of said indication means corresponding to the operated operation element is rendered operative.

* * * * *